H. LAURENCE.
Velocipede.
No. 92,460. Patented July 13, 1869.
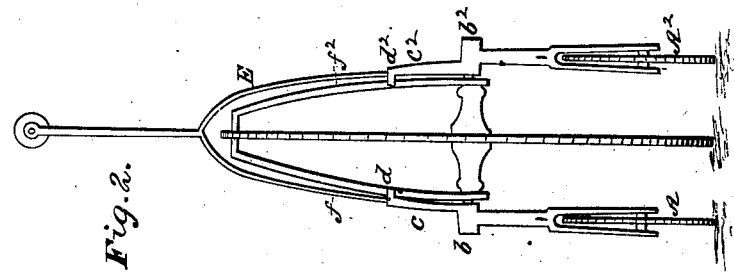
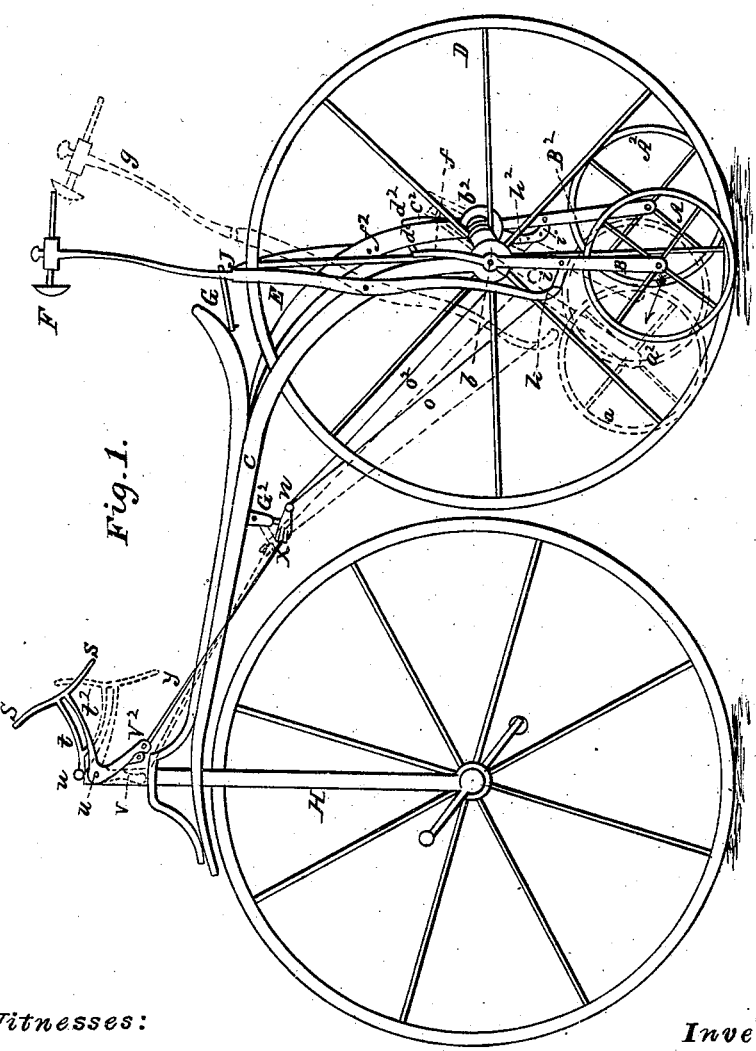
Witnesses:
Jas. R. Beckwith
P. H. Connor
Inventor:
Henry Laurence

United States Patent Office.

HENRY LAURENCE, OF NEW ORLEANS, LOUISIANA.

Letters Patent No. 92,460, dated July 13, 1869.

---

IMPROVEMENT IN VELOCIPEDES.

---

The Schedule referred to in these Letters Patent and making part of the same.

---

*To all whom it may concern:*

Be it known that I, HENRY LAURENCE, of the city of New Orleans, in the parish of Orleans, State of Louisiana, have invented a new and useful Improvement in Velocipedes; and I declare that the following is a clear, full, and exact description of the construction and operation of the same, reference being had to the annexed drawings, making a part of the specification, in which—

Figure 1 is a perspective view.
Figure 2 is a transverse section.
Like letters designate like parts.

The nature of my invention and improvement in velocipedes consists in providing the single or two-wheeled velocipede with one or more adjustable auxiliary wheels or casters, so united and connected with the velocipede, and actuated by suitable mechanical contrivance and device, as to enable the person operating the velocipede to place the casters or auxiliary wheels in contact with the plane or roadway upon which the velocipede is standing or moving, and to withdraw them from such contact, and suspend them in the air, at the will and convenience of the rider; such additional and auxiliary wheels being so arranged, with reference to the wheel or wheels proper of the velocipede, that when the same are in contact with the plane or roadway, on which the velocipede is situated, that together with the wheel or wheels proper of the velocipede, they will form a base or lateral support, and prevent the velocipede from capsizing and falling from its proper position by the action of its specific gravity, the object of my invention being to enable the person operating the velocipede to make a full stop, or proceed at a slow rate of speed, by the aid of the auxiliary wheels, without danger of capsizing or falling, and also enable him at will to obtain the full effect, benefit, and advantage of the single or two-wheeled velocipede, by simply removing the auxiliary wheels from contact with the roadway, and suspending them in the air.

To enable those skilled in the art to make and use my invention, I will proceed to describe its construction and operation.

I construct my velocipede in any of the known forms of velocipedes having less than three wheels, and which will not maintain an upright position at rest without support other than the wheel or wheels proper of the velocipede.

The drawing hereto annexed shows my improvement attached to the common form of two-wheeled velocipede; and in order to obviate the liability to fall of its own accord from an upright position, I use the auxiliary wheels or casters A and $A^2$. These wheels or casters may be constructed of any suitable material, and of any suitable or convenient size, and attached to any velocipede, substantially as hereinafter set forth.

The wheels A and $A^2$ are securely mounted at the lower extremities of the pivoted vibrating arms or levers B and $B^2$, so as to vibrate easily and freely on their centres, in the direction indicated by the arrow in dotted lines $a$ and $a^2$, in fig. 1.

The pivoted arms B and $B^2$ are securely pivoted at the points $b$ and $b^2$, or at any point on the reach or bar C, spanning and connecting the wheels proper of the velocipede, which connecting-bar or reach may be so shaped as to afford facility for pivoting the arms B and $B^2$ at any point above the point $b$, about which the wheel proper of the velocipede revolves, so as to give any desired length to B and $B^2$.

I so adjust the length of said arms that when they are in a perpendicular position, as shown in the annexed drawing, the lowest point of the disk of the wheels A and $A^2$, mounted in said arms, shall be in contact with the same plane upon which the wheel proper, D, is standing.

I mount and attach the said vibrating movable arms B and $B^2$, with their small wheels or casters attached, one on each side of the rear wheel proper, D, or the wheel which is not used for steering, as the case may be, at such a distance from said wheel, that the lateral distance between the wheels A and $A^2$, when mounted and in place, shall be sufficient, with the other wheels of the velocipede, to furnish full and adequate lateral support to the velocipede, and maintain it in an upright position, which distance will vary according to the height or construction of the velocipede to which my improvement is attached.

When the pivoted vibrating arms B and $B^2$ are pivoted, as in the annexed drawing, at the point about which the wheel proper, D, revolves, they may be attached firmly to a strong pin, which passes through the hub of the wheel D, and about which that wheel revolves, so that, by means of the pin, the two arms B and $B^2$ may be rigidly connected, and, with the pin as a fulcrum or pivot, move freely in the direction indicated by the arrow and dotted lines $a$ and $a^2$, or they may move loosely on the pin, and move independently of each other in the same direction, lifting the wheels A and $A^2$ free from contact with the roadway.

If any point above the centre of the wheel D is selected as the point of revolution or pivot of said arms, which is within the diameter of said wheel, then I pivot said arms independently, in any suitable manner, to the forked reach C, so that they act independently, when not otherwise connected by the device used to actuate them.

If the arms B and $B^2$ are constructed of sufficient length to require them to be pivoted at a point above and without the diameter of the wheel D, they can be either rigidly connected to the same rack-shaft or pin, or they may move independently, unless connected and compelled to act simultaneously by the mechanical device for actuating them.

The vibrating arms A and A² may be constructed of any suitable material, and in any suitable form, to accomplish the purpose of mounting the wheels A and A² in the position above described, at a sufficient distance from each other laterally, and so that the wheels may be brought into position as indicated in the drawing annexed, and be capable of being freely actuated in the direction of the arc above described.

In order to prevent the auxiliary wheels A and A² from passing back of the position in which the lower portions or perimeters, at the point of contact with the roadway, will be in the same plane with the same point of the wheel proper of the velocipede D, I construct the vibrating arms B and B², with each a pawl or portion, $c$ and $c^2$, extending above the point or pivot of vibration, $b$, so as to form a short arm on the upper side of the pivot, and so shaped and constructed with a hook or pin, at $d$ and $d^2$, projecting in such a manner at right angles with the arm as to come in contact with some part of the rear surface of the forked reach C or frame of the velocipede, and arrest the backward motion of the arms B and B² at the proper point, and retain them in the proper position while the velocipede is progressing by forward motion, the friction between the wheels A and A² and the roadway, tending to retain the arms B and B² firmly in a perpendicular position, above described.

The auxiliary wheels A and A² may be lifted from their position in contact with the roadway, by moving the pivoted vibrating arms B and B² in the direction of the dotted lines $a$ and $a^2$, fig. 1, which may be accomplished by means of any suitable mechanical device.

The drawings hereto annexed show two devices for accomplishing this object at the will of the rider, which may be used separately or jointly in connection with and aid of each other.

One of said devices consists of the forked lever E, so constructed that the prongs $e$ and $e^2$, when the lever is mounted, as hereinafter described, shall span the wheel D, and permit its free revolution.

Said bifurcated lever E, I mount on the forked reach C, by a point or fulcrum, at $f$ and $f^2$, or at any suitable point, so as to permit the same to move freely in the direction of the dotted line $g$, shown in fig. 1.

I construct said lever in any suitable form, so as to bring the lower extremity of the forks in front of the pivoted vibrating arms B and B², and below the point at which said arms are pivoted; and I connect the said lower extremities of said forked lever at $h$ and $h^2$ with said vibrating arms B and B², by means of the connecting-rods or links $i$ and $i^2$.

Said lever is constructed so that the portion above the point $j$ where the prongs join, is extended to a suitable height to bring the top of the lever to such a position that the person seated on the velocipede, by inclining backward from an upright position, will bring his back in contact with the adjustable pad F, which may be constructed in any convenient form, and by this action bear the upper end of said lever backward in the direction indicated by the dotted line shown in fig. 1, which movement, by means of the connecting-links connecting said lever with the arms B and B², will carry said wheels forward free from the roadway, as indicated by the dotted lines.

In order to cause said wheels A and A² to resume their position to afford a lateral support to the velocipede when the pressure against the pad F is removed, I use the spring G, or its equivalent, so arranged as to effect that purpose, by the joint action of the spring and the specific gravity of the wheels, and the arms to which they are attached.

As a further device for actuating said vibrating levers or arms B and B², and to swing them free from contact with the roadway, which may be used either separately or in connection with the device for that purpose above described, I attach to the under side of the reach or bar C, which connects the wheels proper of the velocipede, the vibrating arm G², securely pivoted at its upper end to said reach, at a point, $b$, between the wheels proper of the velocipede, in such a manner as to permit it to vibrate freely backward and forward in the direction of the reach.

This vibrating arm may be constructed of any suitable material, and of any suitable length, varying according to the size of the velocipede.

At the lower extremity of this arm, I attach the T cross-piece $m$, attached to the vibrating arm G² by toggle-joint or other method, which will permit free motion.

This cross-piece $m$ having the rear end at $n$, a suitable form to permit the connecting-rods $o$ and $o^2$ to be attached by a suitable joint, the rods $o$ and $o^2$ connect with the arms B and B², with a suitable joint at some point below the point where said arms are pivoted, say at $p$, and are made of a suitable length, so that when the arms B and B² are in a position to allow the auxiliary wheels to act, the pivoted arm G² shall be in a position at right angles with the reach C, or perpendicular.

At the forward end of the pivoted cross-piece $m$, I construct a small sheave or pulley, so arranged as to revolve freely on its axis horizontally, all so arranged and connected, that when the lower end of the vibrating arm G² is brought forward, the arms B and B², by means of the connecting-rods $o$ and $o^2$, swing forward to the position shown by the dotted lines, and free from the roadway.

In order to enable the rider to actuate the pivoted bar G² at will, I construct the forked standard H, which carries the steering-wheel, and mount it in the usual manner, except that the upper end of the shaft, where the handle for steering is usually attached, I construct a short cross-head, and on said cross-head I pivot a steering-handle, constructed substantially as follows:

The handle $s\,s$ has connected with it, at right angles, the bent levers $t$ and $t^2$, so attached as to permit the same to be pivoted to the cross-head at $u$ in such a manner as to permit the handle $s\,s$ to be moved freely up and down, as indicated by the dotted lines in fig. 1.

The pivots $u$ and $u^2$ act as a fulcrum; the portions of said bent levers from the pivots $u$ and $u^2$ to the ends at $v$ and $v^2$ being so bent as to bring them down on either side of the standard H, nearly at right angles with the portion extending from $u$ to $s$, the whole forming a bell-crank, the lower arm of which I construct of sufficient length to give sufficient motion for the purpose hereinafter set forth.

The ends $v$ and $v^2$ of the bent lever or bell-crank, I connect together with a flexible band or chain, of any suitable material, which, being first connected at $v$, is passed through the pulley or sheave $x$, and the other end connected with the other bent lever at $v^2$, this band being so adjusted in length that when the wheels A and A² are in contact with the roadway in their proper position, the steering-handle $s\,s$ will assume a convenient position.

The band $y$ being flexible and adjustable, and passing freely about the pulley $x$, leaves a perfectly free use of the steering-wheel for the purpose of guiding the velocipede.

The method of actuating the arms B and B² by means of this device, is to depress the steering-handle $s\,s$ in the direction indicated by the dotted lines in fig. 1, by which, through the action of the bent levers, operating as a bell-crank, through the connecting-band $y$, and the connecting-rods $o$ and $o^2$, the arms B and B², with their wheels, swing from their position in contact with the roadway, and resume it again when the steering-handle is elevated to its original position.

Having thus described my invention,

I now claim, and desire to secure by Letters Patent—

1. The adjustable auxiliary wheels or casters A and A², mounted on the vibrating arms B and B², attached to and connected with the velocipede, substantially in the manner and for the purpose above described.

2. The device and mechanical contrivance for actuating the pivoted vibrating arms B and B², and the wheels A and A², by means of the vibrating steering-handle $s\ s$, with the bent levers or bell-cranks $s\ u\ v$, and $s\ u^2\ v^2$, mounted on and connected with the forked standard H, substantially in the manner and for the purpose above set forth, and connected with the vibrating arms B and B², by means of the flexible band or chain $y$, the vibrating arm $g^2$, the cross-pin $m$, the sheave or pulley $x$, and the connecting-rods $o$ and $o^2$, substantially in the manner and for the purpose above set forth.

HENRY LAURENCE.

Witnesses:
JAS. R. BECKWITH,
P. A. CONAUD.